United States Patent [19]
Maurente et al.

[11] Patent Number: 4,949,690
[45] Date of Patent: Aug. 21, 1990

[54] ELECTRIC AUTOMATIC OIL HEATING AND FUEL EVAPORATING SYSTEM

[76] Inventors: Gilberto V. Maurente, Santiago Rivas 1612, Apt 101 Buceo, Sud America, Montivideo, Uruguay; George Spector, 233 Broadway RM 3815, New York, N.Y. 10007

[21] Appl. No.: 340,699

[22] Filed: Apr. 20, 1989

[51] Int. Cl.$^5$ .................. F02N 17/04; F02M 31/12
[52] U.S. Cl. ........................ 123/142.5 E; 123/549; 123/552
[58] Field of Search .............. 123/549, 557, 142.5 E, 123/179 H, 552

[56] References Cited

U.S. PATENT DOCUMENTS

| | | | |
|---|---|---|---|
| Re. 32,643 | 10/1983 | Bennett et al. | 123/142.5 E |
| 1,781,840 | 11/1930 | Hannegan | 123/142.5 E |
| 1,806,442 | 5/1931 | Bell et al. | 123/142.5 E |
| 2,916,030 | 12/1959 | Hoeth | 123/142.5 E |
| 3,953,707 | 4/1976 | Tanis | 123/142.5 E |
| 3,970,816 | 7/1986 | Hosokawa et al. | 123/142.5 E |
| 4,372,260 | 2/1983 | Baker | 123/142.5 E |
| 4,372,261 | 2/1983 | Sarto | 123/549 |
| 4,458,642 | 7/1984 | Okubo et al. | 123/557 |
| 4,463,738 | 8/1984 | Lee et al. | 123/549 |

*Primary Examiner*—Andrew M. Dolinar
*Assistant Examiner*—M. Macy

[57] ABSTRACT

An oil heating and fuel evaporating system for an internal combustion engine is provided that includes an oil heating unit which will heat the oil in the oil pan of the engine to a predetermined temperature before a fuel evaporator unit will heat the fuel in the fuel duct downstream of a carburetor to a predetermined temperature so that the engine can be quickly started during cold weather conditions.

4 Claims, 1 Drawing Sheet

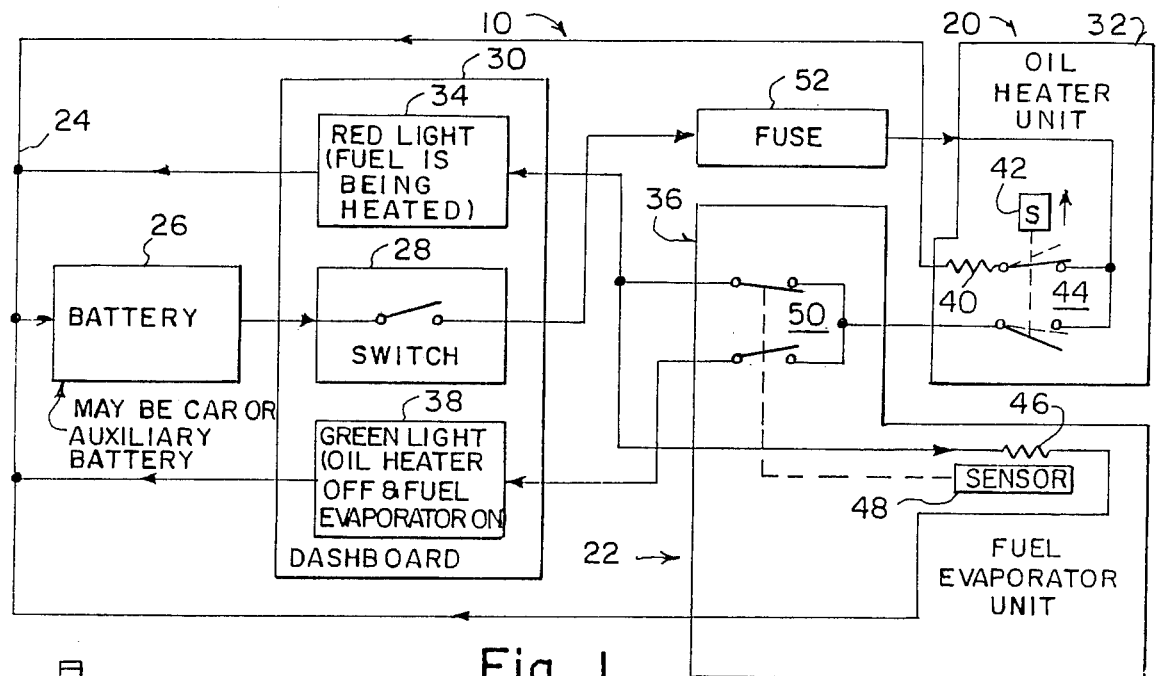
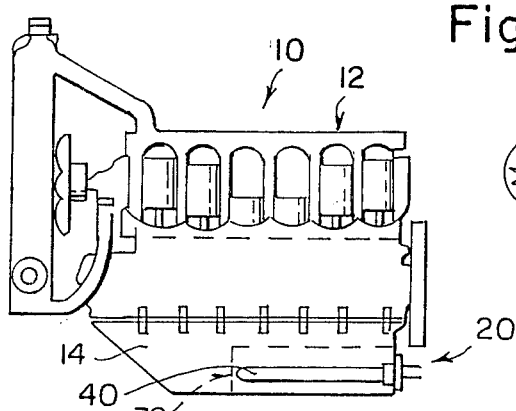
Fig. 2
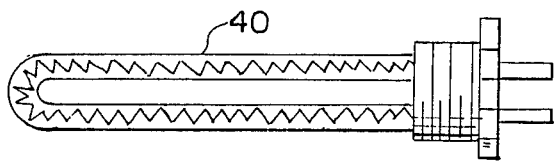
Fig. 3
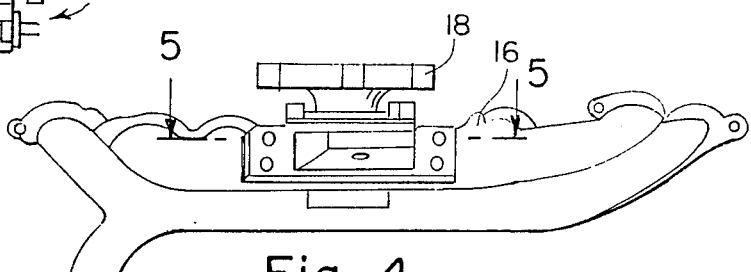
Fig. 4
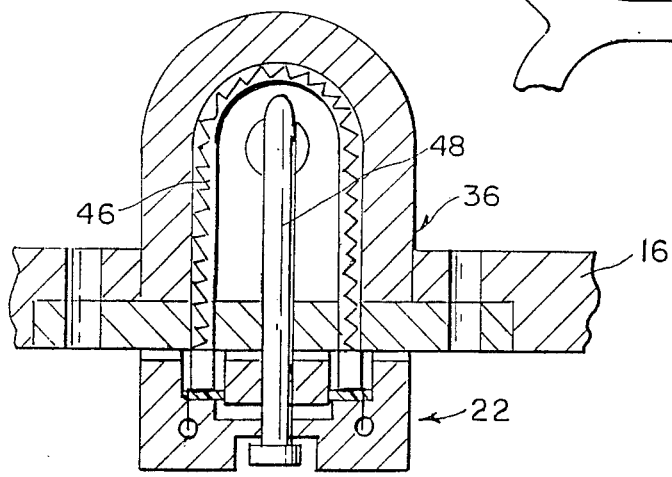
Fig. 5
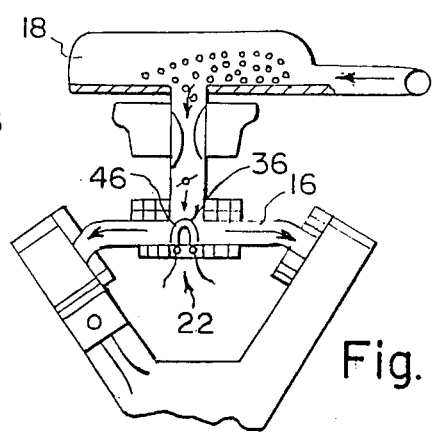
Fig. 6

ELECTRIC AUTOMATIC OIL HEATING AND FUEL EVAPORATING SYSTEM

BACKGROUND OF THE INVENTION

The instant invention relates generally to fuel evaporators and more specifically it relates to an oil heating and fuel evaporating system for an internal combustion engine.

Numerous fuel evaporators have been provided in prior art that are adapted to supply heat to air-fuel mixtures to promote evaporation of fuel in internal combustion engines. For example, U.S. Pat. No. 4,593,670; 4,622,944 and 4,665,879 all are illustrative of such prior art. While these units may be suitable for the particular purpose to which they address, they would not be as suitable for the purposes of the present invention as heretofore described.

SUMMARY OF THE INVENTION

A primary object of the present invention is to provide an oil heating and fuel evaporation system for an internal combustion engine that will overcome the shortcomings of the prior art devices and will permit use of oil of proper viscosity.

Another object is to provide an oil heating and fuel evaporating system for an internal combustion engine which will activate an oil heater to heat the oil in the oil pan and then acctivate a fuel evaporator to heat a fuel-air mixture in the fuel duct so that the engine can be started in cold weather.

An additional object is to provide an oil heating and fuel evaporating system for an internal combustion engine which can be controlled by switch on a panel located in the dashboard of a motor vehicle and which a red light and a green light thereon will indicate the operation stages of the oil heater and fuel evaporator.

A further object is to provide an oil heating and fuel evaporatting system for an internal combustion engine that is simple and easy to use.

A still further object is to provide an oil heating and fuel evaporating system for an internal combustion engine that is economical in cost of manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a block diagram of the electrical circuit of the invention.

FIG. 2 is a side view of an internal combustion engine with parts broken away showing the oil heater therein.

FIG. 3 is an enlarged side view of the oil heater.

FIG. 4 is a side view of a portion of the internal combustion engine showing the fuel duct downstream of the carburetor into which the fuel evaporator is inserted.

FIG. 5 is a cross sectional view taken along line 5—5 in FIG. 4, showing the fuel evaporator in operational position inserted into the engine block below the carburetor.

FIG. 6 is a diagrammatic cross sectional side view of the internal combustion engine showing the fuel evaporator in place in the fuel duct.

DETAILED DESCRRIPTION OF THE PREFERRED EMBODIMENTS

Turning now descriptively to the drawings, in which similar reference characters denote similar elements throughout the several views, the Figures illustrate an oil heating and fuel evaporating system 10 for an internal combustion engine 12 of a motor vehicle having an oil pan 14 and a fuel duct 16 downstream of a carburetor 18. The system 10 contains a first asssembly 20 for heating oil in the oil pan 14 to a predetermined temperature, for example, eighty degrees centigrade, and a second assembly 22 for heating an air-fuel mixture in the fuel duct 16 to a predetermined temnperature after the oil is heated so that the engine 12 can be started during cold weather conditions.

The oil heating assembly 20 includes an electrical circuit 24 with a battery 26 carried in the circuit 24 to supply electricity throughout the circuit. A switch 28 is carried in the circuit 24 and is disposed on dashboard 30 of the moter vehicle to turn the circuit 24 on and off. An oil heater unit 32 is carried in the circuit to heat the oil to the predetermined temperature and then activate the air-fuel mixture heating assembly 22. A red light 34 is carried in the circuit 24 and is disposed on the dashboard 30 to be turned on by the oil heater unit 32 when the oil is heated to the predetermined temperature.

The air-fuel mixture heating assembly 22 includes a fuel evapoaator unit 36 carried in the circuit 24 to heat the air-fuel mixture to the predetermined temperature. A green light 38 is carried in the circuit 24 and is disposed on the dashboard 30 to be turned on by the fuel evaporator unit 36 when the air-fuel mixture is heated to the predetermined temperature, whereby the fuel evaporator unit 36 will turn off the red light 34 so that the engine can be started.

The oil heater unit 32 includes an electrical oil heater 40 to heat the oil to the predetermined temperature, a temperature sensor 42 to be activated by the heated oil and a relay switch 44 operated by the sensor 42 so as to turn the oil heater 40 off, the red light 34 on and the fuel evaporator unit 36 on. Heating of the oil permits using oil of proper viscosity at normal temperatures.

The fuel eevaporator unit 36 includes an electrical fuel heater 46 to heat the air fuel mixture to the predetermined temperature, a temperature sensor 48 to be activated by the heated air-fuel mixture and a relay switch operated by the sensor 48 so as to turn the fuel heater 46 off and the green light 38 on so that the engine 12 can be started.

A security fuse 52 can be added to the circuit 24 and in order not to add a second battery for the heaters 40 and 46, the motor vehicle could be equipped with a high power battery 26. The best place for the oil heater 40 to be installed would be under the entrance of the oil filter to the oil pump. The design of the oil heater 40 should be standardized as much as possible in order to enable its installation in practically all types of engines, varying only in its capacity. The evaporator unit 36 can be inserted from the side or from below the fuel duct 16.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An oil heating and fuel evaporating system for an internal combustion engine of a motor having an oil pan and a fuel duct downstream of a carburetor, said system comprising:
    (a) means for heating oil in the oil pan to a predetermined temperature;
    (b) means for heating an air-fuel mixture in the fuel duct to a predetermined temperature after the oil is heated so that the engine can be started during cold whether conditions;
wherein said oil heating means includes;
    (c) an electrical circuit;
    (d) a battery carried in said circuit to supply electricity throughout said circuit;
    (e) a switch carried in said circuit and disposed on dashboard of the motor vehicle to turn said circuit on and off;
    (f) an oil heater unit carried in said circuit to heat the oil to the predetermined temperature and then activate said air-fuel mixture heating means;
    (g) a red light carried in said circuit and disposed on the dashboard to be turned on by said oil heater unit when the oil is heatted to the predetermined temperature.

2. An oil heating and fuel evaporating system as recited in claim 1, wherein said air-fuel mixture heating means includes:
    (a) a fuel evaporator unit carried in said circuit to heat the air-fuel mixture to the predetermined temperature; and
    (b) a green light carried in said circuit and disposed on the dashboard to be turned on by said fuel evaporator unit when the air-fuel mixture is heated to the predetermined temperature, whereby said fuel evaporator unit will turn off said red light so that the engine can be started.

3. An oil heating and fuel evaporating system as recited in claim 2, wherein said oil heater unit includes:
    (a) an electrical oil heater to heat the oil to the predetermined temperature;
    (b) a temperature sensor to be activated by the heated oil; and
    (c) a relay switch operated by said sensor so as to turn said oil heater off, said light on and said fuel evaporator unit on.

4. An oil heating and fuel-evaporating system as recited in claim 3, wherein said fuel evaporator unit includes:
    (a) an electrical fuel heater to heat the air-fuel mixture to the predetermined temperature;
    (b) a temperature sensor to be activated by the heated air-fuel mixture;
    (c) a relay switch operated by said sensor so as to turn said fuel heater off, said red light off and said green light on so that the engine can be started.

* * * * *